United States Patent
Watanabe et al.

(10) Patent No.: US 9,219,396 B2
(45) Date of Patent: Dec. 22, 2015

(54) ROTARY ELECTRIC MACHINE

(71) Applicant: Mitsubishi Electric Corporation, Chiyoda-ku, Tokyo (JP)

(72) Inventors: Seiya Watanabe, Chiyoda-ku (JP); Hideyuki Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/252,993

(22) Filed: Apr. 15, 2014

(65) Prior Publication Data

US 2015/0162806 A1 Jun. 11, 2015

(30) Foreign Application Priority Data

Dec. 10, 2013 (JP) .................................. 2013-254840

(51) Int. Cl.
*H02K 9/06* (2006.01)

(52) U.S. Cl.
CPC ........................................ *H02K 9/06* (2013.01)

(58) Field of Classification Search
CPC ............. H02K 9/00; H02K 9/06; H02K 5/00; H02K 5/20; H02K 11/046; H02K 15/12; H02K 15/125; H02K 1/226; H02K 1/243; Y10T 29/49009
USPC ........ 310/16, 52–65, 60 A, 60 R, 68 A, 68 B, 310/68 C, 68 D, 68 E, 68 R, 227, 263
See application file for complete search history.

(56) References Cited

U.S. PATENT DOCUMENTS

| | | | |
|---|---|---|---|
| 3,624,438 A * | 11/1971 | Hoyler ............................ | 310/93 |
| 4,128,778 A * | 12/1978 | Merkle et al. ............... | 310/67 R |
| 4,162,419 A * | 7/1979 | DeAngelis .................... | 310/266 |
| 4,584,496 A * | 4/1986 | Frister ........................ | 310/60 R |
| 4,604,538 A * | 8/1986 | Merrill et al. .............. | 310/68 D |
| 5,650,675 A * | 7/1997 | Kanaya et al. .................. | 310/58 |
| 6,087,746 A * | 7/2000 | Couvert et al. ............. | 310/60 R |

FOREIGN PATENT DOCUMENTS

| | | |
|---|---|---|
| JP | 54-046306 A | 4/1979 |
| JP | 55-56439 A | 4/1980 |
| JP | 4884515 B2 | 2/2012 |

OTHER PUBLICATIONS

Communication dated Nov. 25, 2014, issued by the Japanese Patent Office in counterpart Japanese application No. 2013-254840.

* cited by examiner

*Primary Examiner* — Naishadh Desai

(74) *Attorney, Agent, or Firm* — Sughrue Mion, PLLC; Richard C. Turner

(57) ABSTRACT

Provided is a rotary electric machine capable of improving cooling performance for a stator coil and a stator core. In the rotary electric machine, an outer-side outer diameter portion (26) of an exhaust hole (24) is formed on an inner diameter side of a position which is opposed to an axial-direction side end surface (30) of a fan blade (27) of a centrifugal fan (13) in an axial direction. Therefore, the axial-direction side end surface (30) of the fan blade (27) and the exhaust hole (24) have a positional relationship so as not to overlap each other in the axial direction. In this manner, cooling air exhausted through the exhaust hole (24) is unlikely to be forced to return to the exhaust hole (24). Therefore, exhaust efficiency is improved to efficiently cool a stator coil (22) and a stator core (21).

6 Claims, 2 Drawing Sheets

ROTARY ELECTRIC MACHINE

BACKGROUND OF THE INVENTION

1. Field of the Invention

The present invention relates to a rotary electric machine such as a brushless AC generator for a vehicle, to be mounted in, for example, a vehicle such as an automobile, a bus, and a truck.

2. Description of the Related Art

Hitherto, the following brushless rotary electric machine is known. The brushless rotary electric machine includes a case including a pair of brackets, that is, a front bracket and a rear bracket arranged so as to be opposed to each other, a stator fixed to the case, a shaft having both end portions which are rotatably supported respectively by the brackets through bearings, a rotor provided to the shaft, and a cooling fan fixed to the shaft (for example, see Japanese Patent Application Laid-open No. 2011-97777).

Exhaust holes are formed in the front bracket of the rotary electric machine. After cooling a stator coil and a stator core, cooling air generated by the rotation of the cooling fan is exhausted through the exhaust holes.

In the rotary electric machine described in Japanese Patent Application Laid-open No. 2011-97777, the cooling air exhausted through the exhaust holes after cooling the stator coil and the stator core is guided radially outward by the function of the cooling fan.

In the rotary electric machine described above, however, the exhaust holes of the front bracket and the cooling fan are partially opposed to each other in an axial direction. Therefore, a part of the cooling air, which is exhausted through the exhaust holes and guided in a centrifugal direction, is forced to return to the exhaust holes. Thus, exhaust efficiency is low, and hence there is a problem in that the stator coil and the stator core cannot be efficiently cooled.

SUMMARY OF THE INVENTION

The present invention has been made to solve the problem described above, and therefore has an object to provide a rotary electric machine capable of improving cooling performance for a stator coil and a stator core.

According to one embodiment of the present invention, there is provided a rotary electric machine, including: a case including a front bracket and a rear bracket for supporting a shaft; a stator core including a stator coil to be interposed between the front bracket and the rear bracket; and a centrifugal fan including a base portion fixed to a portion of the shaft, which projects externally from the front bracket, and a fan blade formed so as to project from the base portion toward the front bracket, in which the rear bracket includes an intake hole for taking cooling air generated by rotation of the centrifugal fan into interior of the case toward the stator coil and the stator core, in which the front bracket includes an exhaust hole for exhausting the cooling air from the interior of the case after the cooling air cools the stator coil and the stator core, and in which an outer diameter portion of the exhaust hole is formed on an inner diameter side of a position which is opposed to an axial-direction side end surface of the fan blade in an axial direction.

According to the rotary electric machine according to one embodiment of the present invention, the exhaust hole of the front bracket is formed on the inner diameter side of the position which is opposed to the axial-direction side end surface of the fan blade of the centrifugal fan in the axial direction. Therefore, the axial-direction side end surface of the fan blade and the exhaust hole have a positional relationship in which the axial-direction side end surface and the exhaust hole do not overlap each other in the axial direction.

By the above-mentioned positional relationship, the cooling air exhausted through the exhaust hole is unlikely to be forced to return to the exhaust hole. Therefore, exhaust efficiency is improved as compared with conventional cases. As a result, the stator coil and the stator core can be efficiently cooled.

DETAILED DESCRIPTION OF THE PREFERRED EMBODIMENT

First Embodiment

Figure 1:
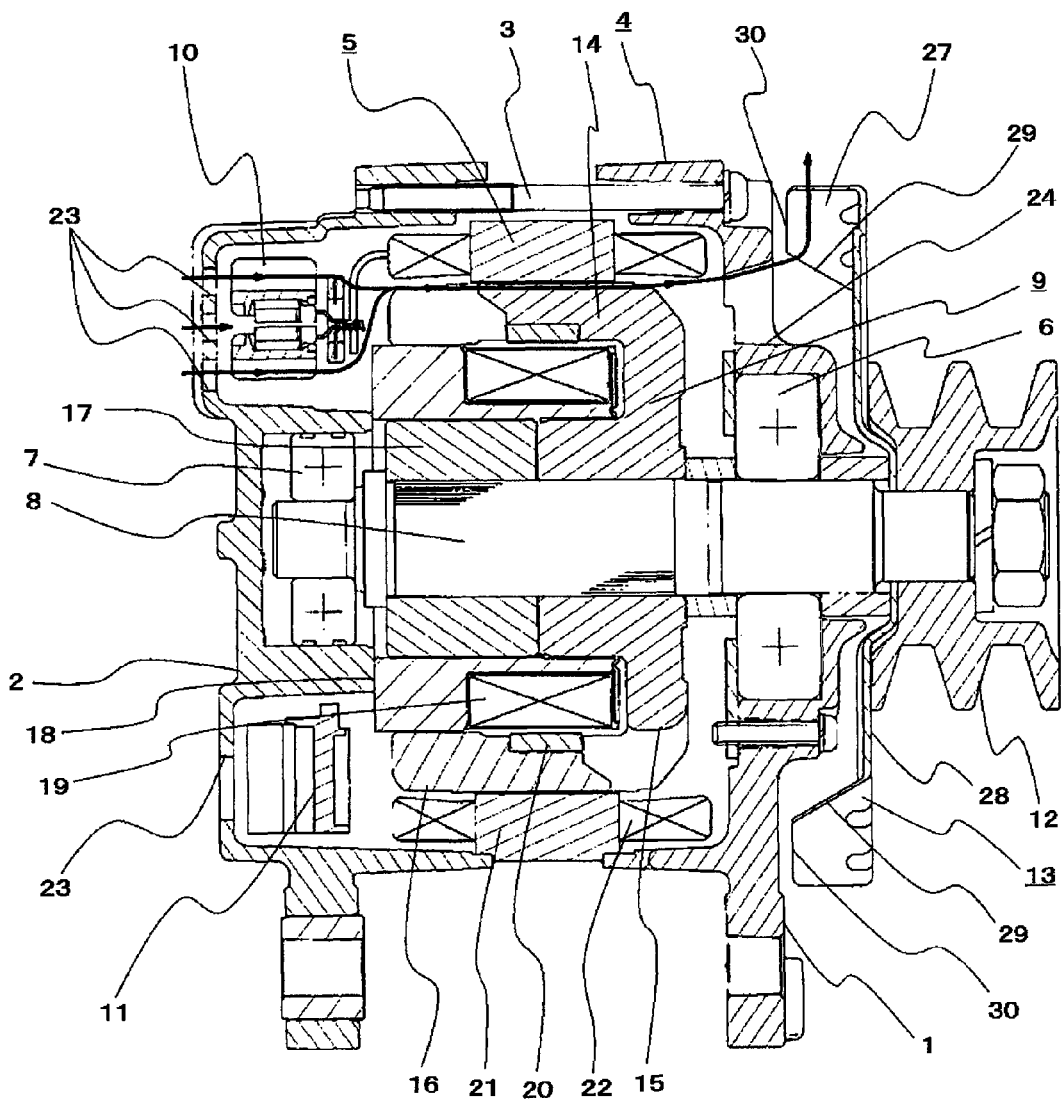
FIG. 1 is a sectional view illustrating a brushless AC generator for a vehicle according to a first embodiment of the present invention.
Figure 2:
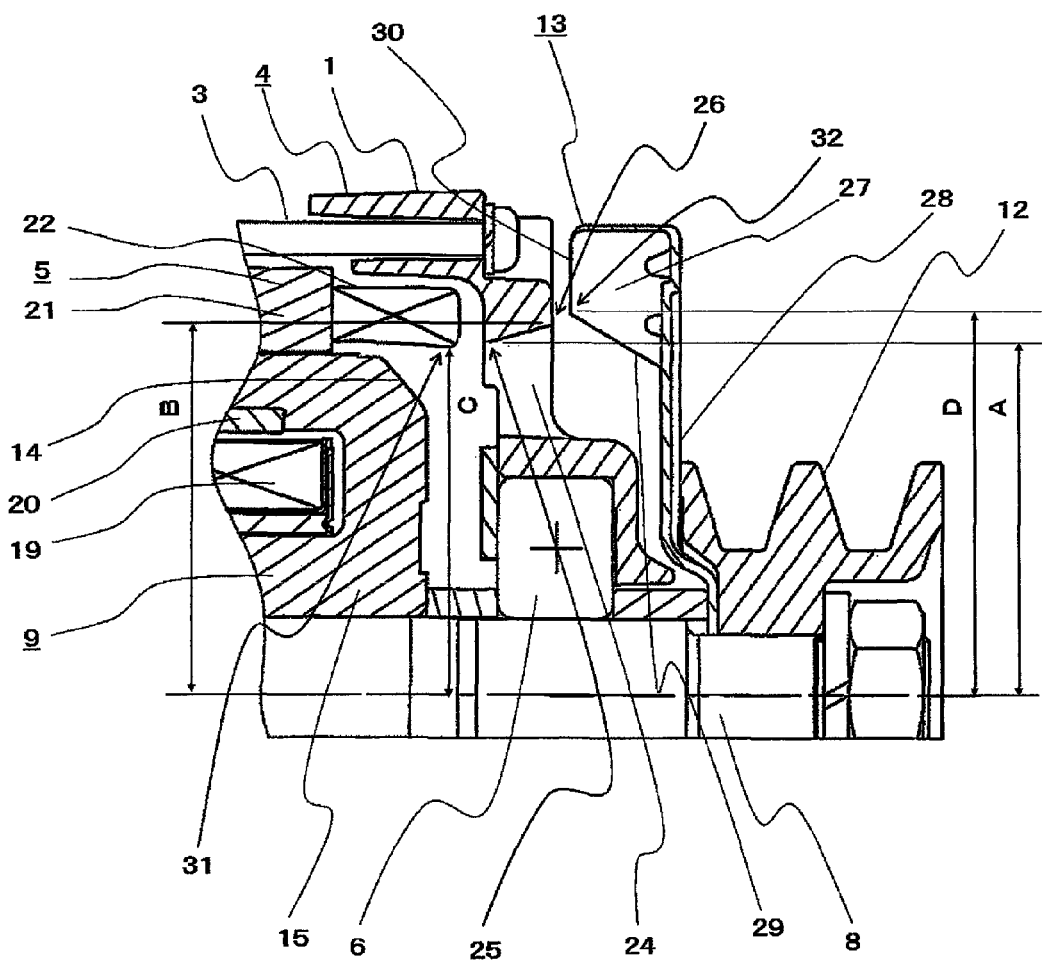
FIG. 2 is an enlarged sectional view of a periphery of a centrifugal fan of the brushless AC generator for a vehicle illustrated in FIG. 1.

FIG. 1 is a sectional view illustrating a brushless AC generator for a vehicle according to a first embodiment of the present invention, and FIG. 2 is an enlarged sectional view of a periphery of a centrifugal fan of the brushless AC generator for a vehicle illustrated in FIG. 1. In the drawings, the same reference symbols denote the same parts.

As illustrated in FIG. 1, the brushless AC generator for a vehicle according to the first embodiment includes a case 4, a stator 5, a shaft 8, a rotor 9, a rectifier 10, and a regulator 11. The case 4 is formed by integrating a front bracket 1 and a rear bracket 2 by a through bolt 3. The stator 5 is fixed to an inner wall surface of the case 4. One end portion of the shaft 8 is rotatably supported by a front bearing 6 mounted to the front bracket 1, whereas another end portion of the shaft 8 is rotatably supported by a rear bearing 7 mounted to the rear bracket 2. The rotor 9 is provided to the shaft 8. The rectifier 10 is fixed to the rear bracket 2, and is electrically connected to the stator 5 so as to convert an AC output into a DC. The regulator 11 is fixed to the rear bracket 2, and controls an AC voltage generated by the stator 5 so that the AC voltage falls within a predetermined range.

A portion of the shaft 8 on the front bracket 1 side extends externally. A pulley 12 is fixed to the extended portion. A belt (not shown) is looped around the pulley 12 and an engine (not shown). The shaft 8 is rotated through the belt by the driving of the engine. A centrifugal fan 13, which is a cooling fan fixed to the shaft 8, is provided between the pulley 12 and the front bracket 1.

The rotor 9 includes a front magnetic-pole core 15 and a rear magnetic-pole core 17. The front magnetic-pole core 15 is fixed to the shaft 8, and includes a plurality of front claw-like magnetic pole portions 14 which are formed equiangularly. The rear magnetic-pole core 17 includes a plurality of rear claw-like magnetic pole portions 16 to mesh with the front claw-like magnetic pole portions 14. On a base end surface, the rear magnetic-pole core 17 is held in surface contact with the front magnetic-pole core 15.

The rotor 9 also includes an excitation core 18 having a cylindrical shape, an excitation coil 19, and a ring 20 having an annular shape. The excitation core 18 is fixed to the rear bracket 2, and is inserted over the rear magnetic-pole core 17. The excitation coil 19 is formed by winding a conducting wire around a small-diameter portion of the excitation core 18. The ring 20 is bonded onto inner circumferential surfaces of the front claw-like magnetic pole portions 14 and inner circumferential surfaces of the rear claw-like magnetic pole portions 16 over the entire circumference by welding or brazing.

The ring 20 is made of a non-magnetic metal.

The stator 5 includes a stator core 21 having a cylindrical shape and a stator coil 22. The stator core 21 is formed by laminating thin steel plates. The stator coil 22 is wound around the stator core 21, and is electrically connected to the rectifier 10.

The rear bracket 2 is formed by aluminum die casting, and includes intake holes 23. Some of the intake holes 23 are formed in a portion of the rear bracket 2, which faces the rectifier 10, and one of the intake holes 23 is formed in the rear bracket 2 in a portion of the rear bracket 2, which faces the regulator 11. With the intake holes 23, the rear bracket 2 is configured so as to take cooling air into the case 4 by the function of the centrifugal fan 13 to cool the rectifier 10 and the regulator 11.

On the other hand, a plurality of exhaust holes 24 are formed in the front bracket 1 formed by aluminum die casting so as to exhaust the cooling air taken into the case 4. FIG. 1 illustrates only one of the exhaust holes 24.

In this embodiment, the exhaust hole 24 of the front bracket 1 is formed to have a diameter which becomes gradually larger from the inside to the outside of the front bracket 1 so that a radial length from an axis of the shaft 8 to an outer-side outer diameter portion 26 formed on an outer end surface of the front bracket 1 becomes larger than a radial length from the axis of the shaft 8 to an inner-side outer diameter portion 25 formed on an inner end surface of the front bracket 1, as illustrated in FIG. 2.

In other words, when the radial length from the axis of the shaft 8 to the inner-side outer diameter portion 25 of the exhaust hole 24 is A and the radial length from the axis of the shaft 8 to the outer-side outer diameter portion 26 is B, the exhaust hole 24 is formed so as to satisfy the following Expression (1).

$$A<B \qquad (1)$$

The centrifugal fan 13 includes a plurality of fan blades 27 and a base portion 28, as illustrated in FIG. 1. The base portion 28 connects the plurality of fan blades 27. The base portion 28 is fixed to the shaft 8 between the front bracket 1 and the pulley 12. Specifically, the centrifugal fan 13 is fixed to the portion of the shaft 8, which projects externally from the front bracket 1.

An inner-diameter-side side surface 29 of each of the fan blades 27 has a tapered shape which inclines to the inner diameter side from an axial-direction side end surface 30 toward the base portion 28.

Next, the position of the exhaust hole 24 formed in the front bracket 1, which is a feature of the present invention, is described.

As illustrated in FIG. 2, the outer-side outer diameter portion 26 of the exhaust hole 24 is formed on the inner diameter side of the position which is opposed to the axial-direction side end surface 30 of the fan blade 27 of the centrifugal fan 13 in the axial direction.

In other words, when the brushless AC generator for a vehicle is viewed from the axial direction, the axial-direction side end surface 30 of the fan blade 27 is located on the outer diameter side, whereas the outer-side outer diameter portion 26 of the exhaust hole 24 is located on the inner diameter side. As a result, the axial-direction end surface 30 of the fan blade 27 and the exhaust hole 24 have a positional relationship in which the axial-direction end surface 30 and the exhaust hole 24 do not overlap each other in the axial direction.

Moreover, in this embodiment, an outer diameter portion of the exhaust hole 24 of the front bracket 1 is formed so as to become larger from the inside of the front bracket 1 to the outside. Therefore, it is apparent that the inner-side outer diameter portion 25 of the exhaust hole 24 is formed on the inner diameter side of the position which is opposed to the axial-direction side end surface 30 of the fan blade 27 of the centrifugal fan 13 in the axial direction.

Further, the positional relationship between an inner diameter portion 31 at a coil end of the stator coil 22 on the front bracket 1 side and the inner-side outer diameter portion 25 of the exhaust hole 24 is described referring to FIG. 2.

First, as illustrated in FIG. 2, a radial length from the axis of the shaft 8 to the inner diameter portion 31 at the coil end of the stator coil 22 on the front bracket 1 side is defined as C and a radial length from the axis of the shaft 8 to an inner diameter portion 32 of the axial-direction side end surface 30 of the fan blade 27 of the centrifugal fan 13 is defined as D.

In this embodiment, the radial length B from the axis of the shaft 8 to the outer-side outer diameter portion 26 of the exhaust hole 24 is set smaller than the radial length D from the axis of the shaft 8 to the inner diameter portion 32 of the axial-direction side end surface 30 of the fan blade 27.

On the other hand, the radial length A from the axis of the shaft 8 to the inner-side outer diameter portion 25 of the exhaust hole 24 is set larger than the radial length C from the axis of the shaft 8 to the inner diameter portion 31 at the coil end of the stator coil 22 on the front bracket 1 side.

Summarizing the above-mentioned relationships, the brushless AC generator for a vehicle is formed so as to satisfy the following Expression (2).

$$C<A<B<D \qquad (2)$$

In the brushless AC generator for a vehicle, which is configured as described above, a current is supplied from a battery (not shown) to the excitation coil 19 fixed to the rear bracket 2 through the excitation core 18 to generate a magnetic flux. By the generated magnetic flux, the front claw-like magnetic-pole portions 14 are magnetized to the N-pole, whereas the rear claw-like magnetic-pole portions 16 are magnetized to the S-pole.

On the other hand, the pulley 12 is driven by the engine to rotate the shaft 8. As a result, the front magnetic-pole core 15 and the rear magnetic-pole core 17 of the rotor 9 are rotated to apply a rotating magnetic field to the stator core 21. As a result, an electromotive force is generated in the stator coil 22. The AC electromotive force is rectified into a DC by the rectifier 10 to charge the battery.

On the other hand, the centrifugal fan 13 rotates with the rotation of the shaft 8. As a result, the cooling air passing through the intake holes 23 formed on the rectifier 10 side mainly passes through the rectifier 10 and a clearance between the stator 5 (the stator core 21 and the stator coil 22) and the rotor 9, and is then exhausted out of the case 4 through the exhaust hole 24, as indicated by the arrow.

Moreover, the cooling air passing from the intake hole 23 formed on the regulator 11 side mainly passes through the regulator 11 and a clearance between the stator 5 (the stator core 21 and the stator coil 22) and the rotor 9, and is similarly exhausted out of the case 4 through the exhaust hole (not shown).

According to the brushless AC generator for a vehicle of this embodiment, the outer-side outer diameter portion 26 of the exhaust hole 24 of the front bracket 1 is located on the inner diameter side of the position which is opposed to the axial-direction side end surface 30 of the fan blade 27 of the centrifugal fan 13 in the axial direction. Therefore, the axial-direction side end surface 30 of the fan blade 27 and the exhaust hole 24 have the positional relationship in which the axial-direction side end surface 30 and the exhaust hole 24 do not overlap each other in the axial direction.

A large amount of the cooling air which is forced to return to the exhaust hole 24 after being exhausted through the exhaust hole 24 passes through the vicinity of the axial-direction side end surface 30, not through the vicinity of the base portion 28 of the fan blade 27 in the axial direction.

Therefore, by setting the positional relationship in which at least the axial-direction side end surface 30 of the fan blade 27 and the exhaust hole 24 do not overlap each other in the axial direction, the cooling air exhausted through the exhaust hole 24 is unlikely to be forced to return to the exhaust hole 24. Therefore, exhaust efficiency is improved as compared with the conventional cases, and hence an exhaust amount can be increased. The increase in the exhaust amount also leads to an increase in intake amount of air taken through the intake holes 23. Thus, the amount of cooling air flowing inside the case 4 increases. As a result, the stator coil 22 and the stator core 21 can be efficiently cooled as compared with the conventional cases.

Further, by the increase in the amount of cooling air flowing inside the case 4, the cooling efficiency can be also improved for internal components (for example, the rectifier 10 and the regulator 11, the front bearing 6 and the rear bearing 7, or the exhaust core 18 and the exhaust coil 19) present in a passage path of the cooling air flowing inside the case 4. Thus, the output of the brushless AC generator for a vehicle can also be improved. In addition, by setting the positional relationship in which the axial-direction side end surface 30 of the fan blade 27 and the exhaust hole 24 do not overlap each other in the axial direction, an order component of noise generated when the cooing air passes through the exhaust hole 24 is decomposed. As a result, the noise can be reduced.

Moreover, in this embodiment, the radial length B from the axis of the shaft 8 to the outer-side outer diameter portion 26 of the exhaust hole 24 is set smaller than the radial length D from the axis of the shaft 8 to the inner diameter portion 32 of the axial-direction side end surface 30 of the fan blade 27, as the positional relationship between the axial-direction side end surface 30 of the fan blade 27 and the exhaust hole 24, which prevent the axial-direction side end surface 30 and the exhaust hole 24 from overlapping each other in the axial direction. However, the relationship between the radial lengths B and D is not limited to that described above. Even when the radial length D from the axis of the shaft 8 to the inner diameter portion 32 of the axial-direction side end surface 30 of the fan blade 27 and the radial length B from the axis of the shaft 8 to the outer-side outer diameter portion 26 of the exhaust hole 24 are the same, the cooling air exhausted through the exhaust hole 24 is unlikely to be forced to return to the exhaust hole 24. Therefore, the above-mentioned effects are provided.

Further, according to the brushless AC generator for a vehicle of this embodiment, the radial length A from the axis of the shaft 8 to the inner-side outer diameter portion 25 of the exhaust hole 24 and the radial length B from the axis of the shaft 8 to the outer-side outer diameter portion 26 are formed to satisfy the following Expression (1).

$$A<B \tag{1}$$

Therefore, the exhaust hole 24 serves to guide the cooling air radially outward while the cooling air is passing through the exhaust hole 24. Therefore, the function of the fan blade 27 of the centrifugal fan 13 for pushing the cooling air radially outward can be accelerated to further improve the exhaust efficiency. Therefore, the stator coil 22 and the stator core 21 can be efficiently cooled.

In addition to the setting described above, according to the brushless AC generator for a vehicle of this embodiment, the radial length B from the axis of the shaft 8 to the outer-side outer diameter portion 26 of the exhaust hole 24 is set smaller than the radial length D from the axis of the shaft 8 to the inner diameter portion 32 of the axial-direction side end surface 30 of the fan blade 27, whereas the radial length A from the axis of the shaft 8 to the inner-side outer diameter portion 25 of the exhaust hole 24 is set larger than the radial length C from the axis of the shaft 8 to the inner diameter portion 31 at the coil end of the stator coil 22 on the front bracket 1 side. In this manner, the radial lengths A, B, C, and D are formed to satisfy the following Expression (2).

$$C<A<B<D \tag{2}$$

As a result, the exhaust hole 24 serves to guide the cooling air radially outward while the cooling air is passing through the vicinity of the coil end of the stator coil 22 on the front bracket 1 side, the exhaust hole 24, and the vicinity of the fan blade 27. Therefore, the function of the fan blade 27 of the centrifugal fan 13, for pushing the cooling air radially outward can be accelerated to further improve the exhaust efficiency. Therefore, the stator coil 22 and the stator core 21 can be efficiently cooled.

Moreover, according to the brushless AC generator for a vehicle of this embodiment, the inner-diameter-side side surface 29 of the fan blade 27 has a tapered shape which inclines to the inner diameter side from the axial-direction side end surface 30 toward the base portion 28.

The cooling air exhausted through the exhaust hole 24 is abruptly subjected to a force in a centrifugal direction by the functions of the centrifugal fan 13, and is then exhausted out of the brushless AC generator for a vehicle. At this time, when an area of the fan blade 27, which is subjected to the cooling air, is large, the exhaust efficiency is improved. Therefore, the cooling air can be efficiently exhausted out of the brushless AC generator for a vehicle without changing the radial position of the axial-direction side end surface 30 of the fan blade 27. Thus, the exhaust efficiency can be further improved to efficiently cool the stator coil 22 and the stator core 21.

The shapes of the inner-side outer diameter portion 25 of the exhaust hole 24, the outer-side outer diameter portion 26 of the exhaust hole 24, the inner diameter portion 31 at the coil end of the stator coil 22 on the front bracket 1 side, and the inner diameter portion 32 of the axial-direction side end surface 30 of the fan blade 27 are not limited to arc-like shapes. Each of the inner-side outer diameter portion 25, the outer-side outer diameter portion 26, the inner diameter portion 31, and the inner diameter portion 32 merely indicates the radial position with respect to the axis of the shaft 8.

In the embodiment described above, after the cooling air generated by the centrifugal fan 13 passes through the intake holes 23 of the rear bracket 2 into the interior of the case 4 to cool the rectifier 10 and the regulator 11, the cooling air passes through the clearance between the stator 5 (the stator core 21 and the stator coil 22) and the rotor 9 to be exhausted out of the case 4 through the exhaust hole 24. However, the passage of the cooling air is not limited thereto. A passage of the cooling air for cooling the rectifier 10 and the regulator 11 and a passage of the cooling air for cooling the stator core 21 and the stator coil 22 may be configured separately.

In this case, the cooling air which is warmed after cooling the rectifier 10 and the regulator 11 is not used to cool the stator core 21 and the stator coil 22. Therefore, the cooling efficiency for the stator core 21 and the stator coil 22 is improved.

In the embodiment described above, the brushless AC generator for a vehicle is described as the rotary electric machine. However, the rotary electric machine is not limited to the brushless AC generator for a vehicle. The present invention is applicable to all types of rotary electric machines including a centrifugal fan provided outside of a case.

What is claimed is:

1. A rotary electric machine, comprising:
   a case comprising:
      a front bracket; and
      a rear bracket, the front and rear brackets configured to support a shaft;
   a stator core comprising a stator coil, the stator core interposed between the front bracket and the rear bracket; and
   a centrifugal fan comprising:
      a base portion fixed to the shaft, the base portion projecting externally from the front bracket; and
      a fan blade protruding toward the front bracket from the base portion, the fan blade comprising an inner surface extending in a radial direction of the centrifugal fan,
   wherein the rear bracket comprises an intake hole for taking cooling air generated by rotation of the centrifugal fan into an interior of the case toward the stator coil and the stator core,
   wherein the front bracket comprises an exhaust hole for exhausting the cooling air from the interior of the case after the cooling air cools the stator coil and the stator core, the exhaust hole comprising an inlet surface and an outlet surface, and
   wherein a radially outer-most portion of the outlet surface of the exhaust hole is provided at a radially inner side of the radially inner surface of the fan blade.

2. The rotary electric machine according to claim 1, wherein a radial length A from an axis of the shaft to an inner-side outer diameter portion formed on an inner end surface of the front bracket in the exhaust hole and a radial length B from the axis of the shaft to an outer-side outer diameter portion formed on an outer end surface of the front bracket in the exhaust hole satisfy Expression (1):

$$A<B \tag{1}$$

3. A rotary electric machine, comprising:
   a case comprising a front bracket and a rear bracket for supporting a shaft;
   a stator core including a stator coil to be interposed between the front bracket and the rear bracket; and
   a centrifugal fan comprising a base portion fixed to a portion of the shaft, which projects externally from the front bracket, and a fan blade formed so as to project from the base portion toward the front bracket,
   wherein the rear bracket includes an intake hole for cooling air generated by rotation of the centrifugal fan into interior of the case toward the stator coil and the stator core,
   wherein the front bracket includes an exhaust hole for exhausting the cooling air from the interior of the case after the cooling air cools the stator coil and the stator core,
   wherein an outer diameter portion of the exhaust hole is formed on an inner diameter side of a position which is opposed to an axial-direction side end surface of the fan blade in an axial direction,
   wherein a radial length A from an axis of the shaft to an inner-side outer diameter portion formed on an inner end surface of the front bracket in the exhaust hole and a radial length B from the axis of the shaft to an outer-side outer diameter portion formed on an outer end surface of the front bracket in the exhaust hole satisfy Expression (1):

$$A<B \tag{1}, and$$

wherein a radial length C from the axis of the shaft to an inner diameter portion at a coil end of the stator coil on the front bracket side and a radial length D from the axis of the shaft to an inner diameter portion on the axial-direction side end surface of the fan blade satisfy Expression (2):

$$C<A<B<D \tag{2}$$

4. The rotary electric machine according to claim 1, wherein an inner-diameter-side side surface of the fan blade has a tapered shape which inclines to the inner diameter side from the axial-direction side end surface toward the base portion.

5. The rotary electric machine according to claim 1, wherein the rotary electric machine comprises a brushless AC generator for a vehicle.

6. The rotary electric machine according to claim 1, wherein an area of the outlet surface of the exhaust hole is greater than an area of the inlet surface of the exhaust hole.

* * * * *